US009066402B2

(12) United States Patent
Campbell et al.

(10) Patent No.: US 9,066,402 B2
(45) Date of Patent: Jun. 23, 2015

(54) LED-BASED LIGHTING FIXTURES AND RELATED METHODS FOR THERMAL MANAGEMENT

(75) Inventors: Gregory Campbell, Quincy, MA (US); Igor Shikh, Newton Center, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 211 days.

(21) Appl. No.: 13/392,261

(22) PCT Filed: Aug. 17, 2010

(86) PCT No.: PCT/IB2010/053708
§ 371 (c)(1), (2), (4) Date: Feb. 24, 2012

(87) PCT Pub. No.: WO2011/024098
PCT Pub. Date: Mar. 3, 2011

(65) Prior Publication Data

US 2012/0146548 A1 Jun. 14, 2012

Related U.S. Application Data

(60) Provisional application No. 61/236,556, filed on Aug. 25, 2009.

(51) Int. Cl.
*H05B 33/08* (2006.01)
*H05B 37/02* (2006.01)
*B60Q 1/50* (2006.01)

(52) U.S. Cl.
CPC .................................. *H05B 33/0854* (2013.01)

(58) Field of Classification Search
USPC ...................... 315/297, 307, 209 R, 210, 309
See application file for complete search history.

(56) References Cited

U.S. PATENT DOCUMENTS

| | | | | |
|---|---|---|---|---|
| 6,078,148 | A * | 6/2000 | Hochstein | 315/291 |
| 8,193,737 | B2 * | 6/2012 | Peker et al. | 315/307 |
| 8,253,666 | B2 * | 8/2012 | Shteynberg et al. | 345/82 |
| 2007/0040512 | A1 | 2/2007 | Jungwirth et al. | |
| 2007/0108846 | A1 * | 5/2007 | Ashdown | 307/149 |
| 2007/0120496 | A1 | 5/2007 | Shimizu et al. | |
| 2008/0007182 | A1 | 1/2008 | Deurenberg et al. | |
| 2009/0079362 | A1 | 3/2009 | Shteynberg et al. | |

FOREIGN PATENT DOCUMENTS

| | | | |
|---|---|---|---|
| EP | 1521503 | A1 | 4/2005 |
| EP | 1662583 | A1 | 5/2006 |
| JP | 2006066498 | A | 3/2006 |
| JP | 2006318733 | A | 11/2006 |
| JP | 2007109747 | A | 4/2007 |

* cited by examiner

*Primary Examiner* — Daniel D Chang
(74) *Attorney, Agent, or Firm* — Yuliya Mathis

(57) ABSTRACT

Disclosed is a light emitting diode (LED)-based lighting fixture including an LED and a voltage supply configured to provide electrical power to the LED. The LED-based lighting fixture also includes a temperature sensor configured to determine a temperature at a selected location of the lighting fixture; and a controller connected between the temperature sensor and the voltage supply and configured to determine an ambient temperature and a drive current based on the ambient temperature and to provide an input voltage to the LED based on the drive current. A method of controlling the operational lifetime of an LED, a computer readable medium and an apparatus are also described.

14 Claims, 5 Drawing Sheets

| Ambient Temperature °C | Temp Sensor Temperature °C | Vout of Temp Sensor | A/D Value | Average LED Package Temp °C | Average Junction Temp °C | Steady State Power Level | Light Output |
|---|---|---|---|---|---|---|---|
| 25 | 46.4 | 1.286 | 263 | 62.4 | 73.5 | 27.7W | 1050 |
| 30 | 55.4 | 1.476 | 302 | 70.3 | 81.2 | 27.7W | 1050 |
| 35 | 59.3 | 1.567 | 320 | 76.9 | 88.1 | 26.5W | 1002 |
| 38 | 60.5 | 1.587 | 325 | 77.3 | 88.4 | 26.5W | 1002 |
| 40 | 61.3 | 1.595 | 327 | 77.2 | 88.1 | 24.4W | 930 |
| 42 | 62.1 | 1.611 | 330 | 77.6 | 88.7 | 24.4W | 930 |
| 45 | 62.7 | 1.623 | 333 | 77.4 | 88.5 | 22.7W | 875 |
| 48 | 63.6 | 1.641 | 336 | 78.2 | 89.3 | 22.7W | 875 |
| 50 | 64.4 | 1.655 | 339 | 77.6 | 88.7 | 20.5W | 790 |

FIG. 2

Measuring a temperature at a location of an LED-based lighting fixture — 301

↓

Calculating a temperature of a junction of the LED based on the measured temperature — 302

↓

Adjusting a drive current so that the temperature at the junction remains below a threshold level, or adjusting the drive current to attain a particular luminous output level by the LED, or both. — 303

LED-BASED LIGHTING FIXTURES AND RELATED METHODS FOR THERMAL MANAGEMENT

TECHNICAL FIELD

The present disclosure is directed generally to LED-based lighting fixtures. More particularly, various inventive methods and apparatus disclosed herein relate to thermal management of LED-based lighting fixtures.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, the disclosures of which are specifically incorporated herein by reference.

As is known, the lifetime of an LED is related to the junction temperature; the greater the junction temperature, the shorter the lifetime of the LED. LED lifetime requirements based on the junction temperature of the LEDs are often specified at the maximum ambient temperature rating of the product. Illustratively, the lifetime requirement is fifty thousand hours of operation at 50° C., with the understanding that the higher the ambient temperature, the higher junction temperature of the LED, leading to shorter lifetime. Often, LEDs designed to this standard are driven at a particular drive current to attain an output power. In order to meet the lifetime requirements, the power output to the LEDs in known LED-based lighting fixtures is set at the same level regardless of the ambient temperature. For example, the power output level is selected for the maximum ambient temperature and junction temperature to meet the lifetime specification. Naturally, at a lower ambient temperature and junction temperature, the drive current to the LEDs is lower for the output power selected for maximum ambient and lifetime criteria. Illustratively, at ambient temperatures in the range of 25° C. to 30° C., at the selected output level, the junction temperature of the LEDs, the lifetime is increased over that of the requirements, but is realized at the cost of reduced output power. Accordingly, because of the design criteria for LED lifetime are based on comparatively high ambient temperatures (e.g., 50° C.), known LED-based lighting fixtures operating at typical ambient temperatures (e.g., 25° C. to 30° C.), are not driven with the maximum current possible for the lifetime requirements.

Thus, there is a need in the art to provide LED-based lighting fixtures that have a greater power output over typical ambient temperature ranges while complying with lifetime specifications for higher ambient temperatures.

SUMMARY

Applicants have recognized and appreciated that it would be beneficial to provide better control over the drive current based on temperature at the junction of LED light sources, such that their lifetime requirements are met, while improving their light output performance over a wide range of junction temperatures. In addition, Applicants have recognized and appreciated that the LED junction temperature advantageously can be determined in the controller for an LED-based lighting fixture, rather than measured directly via a dedicated temperature sensor for the LED. Furthermore, Applicants have recognized that temperature sensing at one or more locations of the LED-based lighting fixture itself can be used to correlate to an ambient temperature, which in-turn can be used to correlate to a junction temperature.

Generally, in one aspect, the present disclosure focuses on an LED-based lighting fixture, employing an LED and a power source configured to provide electrical power to the LED. The lighting fixture includes a temperature sensor configured to measure a temperature at a selected location of the lighting fixture; and a controller connected between the temperature sensor and the power source and configured to determine an ambient temperature and a drive current based on the ambient temperature, and to provide an input signal to the power source based on the drive current.

In accordance with another aspect, a method of controlling the operational lifetime of an LED includes measuring a temperature at a location of an LED-based lighting fixture; calculating a temperature of a junction of the LED based on the measured temperature; and based on the calculating, either adjusting a drive current so that the temperature at the junction remains below a threshold level, or adjusting the drive current to attain a particular luminous output level by the LED, or both.

The present disclosure also focuses on a computer-readable medium storing a program, executable by a controller, for controlling the operational lifetime of an LED. The computer readable medium comprises a measuring code segment for measuring a temperature at a location of an LED-based lighting fixture; a calculating code segment for calculating a temperature of a junction of the LED based on the measured temperature; and an adjusting code segment for adjusting a drive current so that the temperature at the junction remains below a threshold level, or adjusting the drive current to attain a particular luminous output level by the LED, or both.

In accordance with yet another aspect, an apparatus for controlling the operational lifetime of an LED includes a power source configured to provide electrical power to the LED; a temperature sensor configured to determine a temperature at a selected location of the lighting fixture; a controller connected between the temperature sensor and the power source and configured to correlate a measured temperature to a drive current, and to provide an input signal based on the drive current.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatuses relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2 illustrates a table showing temperatures, light output and lifetime in accordance with a representative embodiment.

DETAILED DESCRIPTION

Figure 1A:
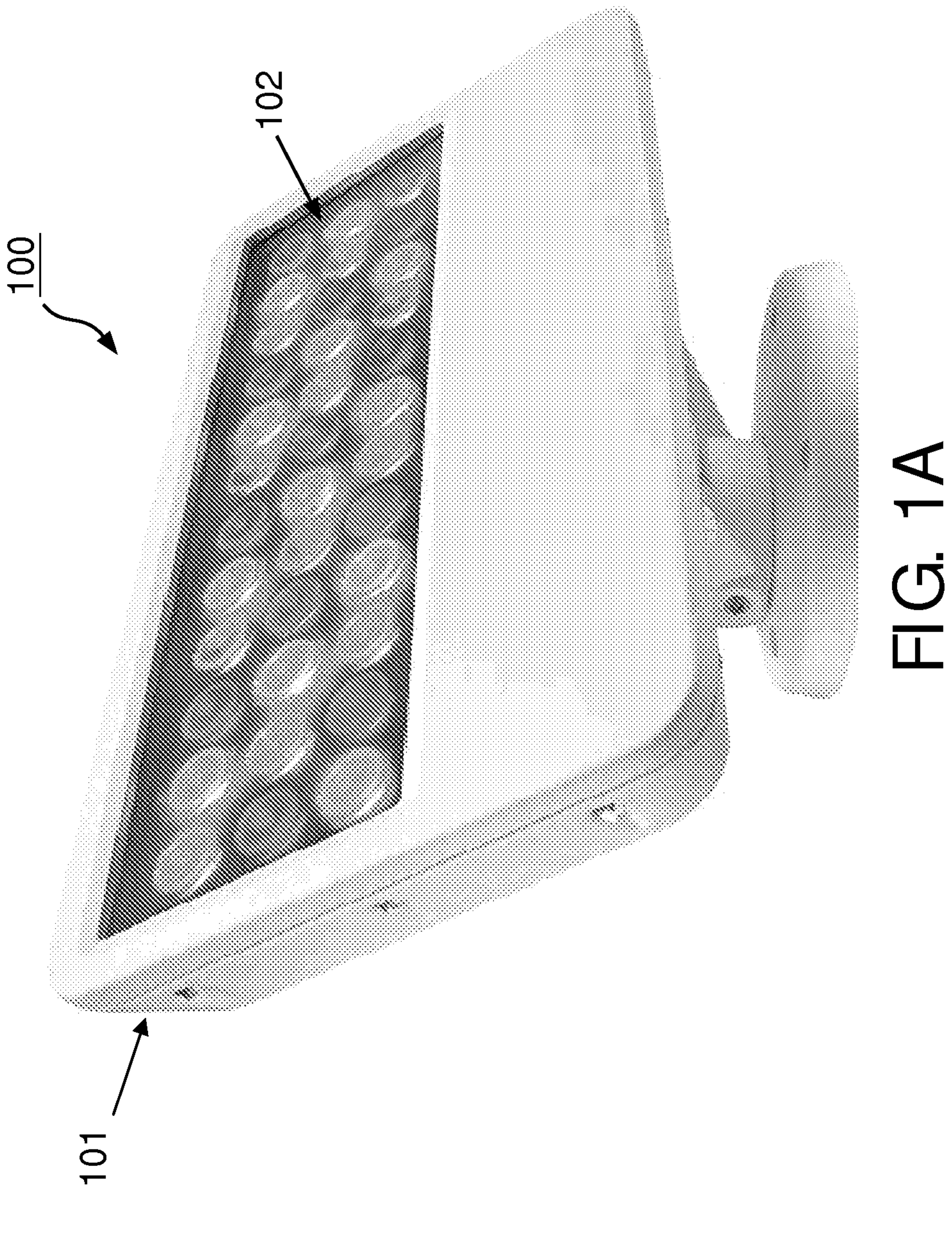
FIG. 1A illustrates a perspective view of an LED-based lighting fixture in accordance with a representative embodiment.

Referring to FIG. 1A, an LED-based light fixture ("fixture") 100 is illustrated in perspective view. The fixture 100 includes a housing 101 and LEDs 102 as a unit. As described more fully below, electronic components and devices useful in driving the LEDs 102 are provided in the housing 100. In a representative embodiment, the electronic components may be provided in one or more separate packages (not shown in FIG. 1A) and disposed in the housing 101. Moreover, the LEDs 102 may be provided in a separate package (not shown in FIG. 1A) and disposed in the housing 101. The packages that are disposed in the housing 101 may include one or more substrates each including one or more electrical and electronic devices. As will become clearer as the present description continues, embodiments are described in the context of certain architectures having electronic components and devices that can be integrated and packaged to different degrees. It is emphasized that the architectures described in connection with the representative embodiments are intended to be illustrative and that other architectures are contemplated.

Figure 1B:
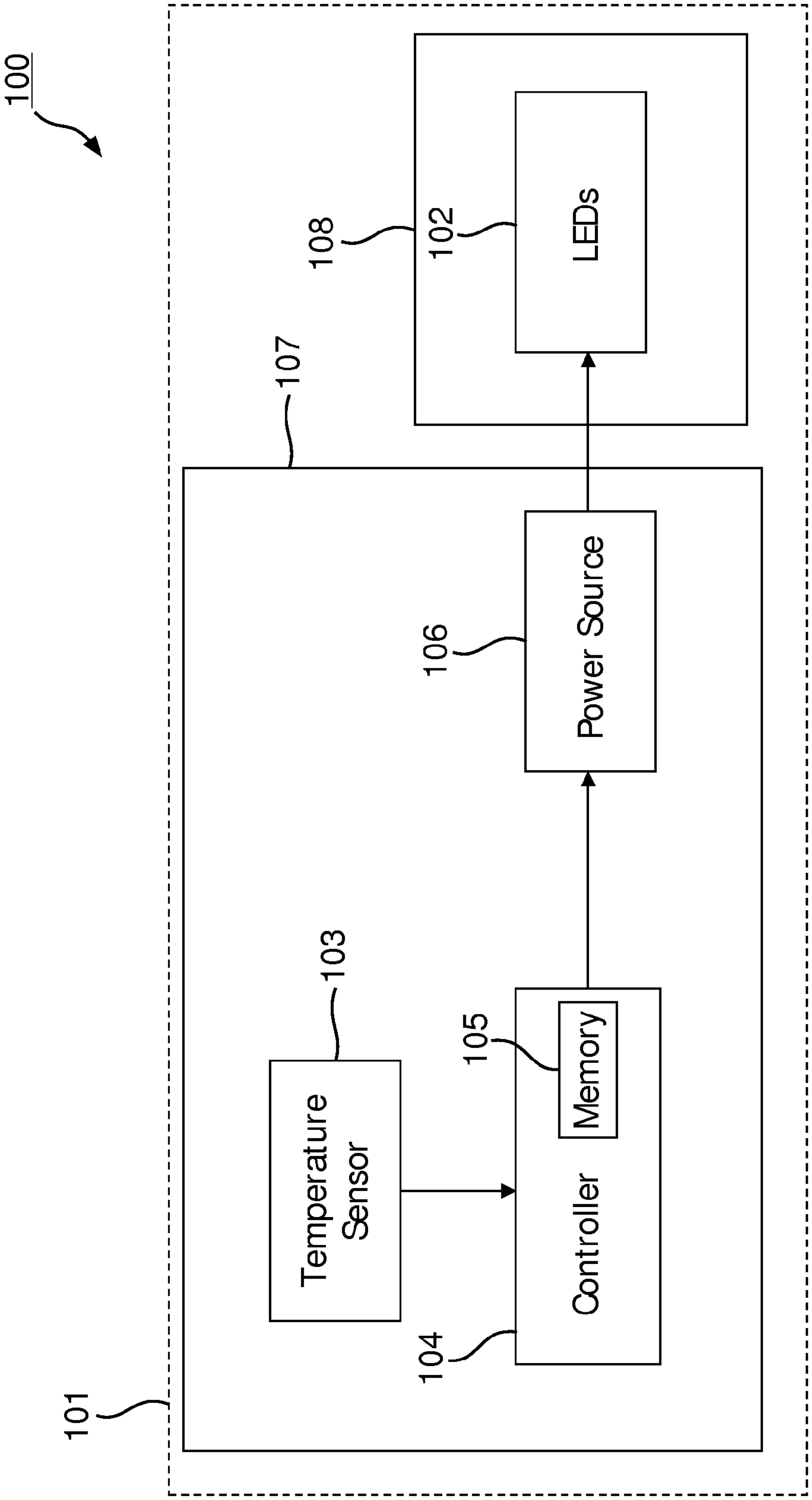
FIG. 1B illustrates a simplified schematic block diagram of an LED-based lighting fixture in accordance with a representative embodiment.

Referring to FIG. 1B, a simplified schematic block diagram of the LED-based lighting fixture 100 in accordance with a representative embodiment is shown. The lighting fixture 100 includes a temperature sensor 103, which provides an input to a controller 104, which includes a memory 105. The controller 104 provides an output to a power source 106. The power source 106 in turn provides electrical power to LEDs 102. The temperature sensor 103 is illustratively a thermistor, or similar device that takes measurements at one or more locations of the lighting fixture 100 and gathers temperature data during operation of the LEDs 102. Illustratively, the temperature sensor 103 is a thermistor integrated circuit (IC), commercially available from Microchip Technology, Inc., Chandler, Ariz. USA.

In a representative embodiment, the temperature sensor 103, the controller 104 (with memory 105), the power source 106 and the LEDs 102 are provided over a common substrate (not shown) such as a printed circuit board (e.g., FR4). The common substrate is then provided in the housing 101. Alternatively, one or more of these components may be located on different substrates. In a representative embodiment, the power source 106 may be provided over a separate substrate (e.g., circuit board) and in a first package 107 due to its heat generating characteristics; and the LEDs 102 may be provided over a second substrate and in a second package 108. The packages 107, 108 may then be provided in the housing 101 of the fixture 100. Still alternatively, the first package 107 and the second package 108 may not be provided in a common housing (e.g., housing 101), but rather in separate housings (not shown) with required electrical connections therebetween.

Some or all of the temperature sensor 103, the controller 104, the power source 106 and the LEDs 102 of the fixture 100 may be integrated. In this case, one or more of these components may be provided over the common substrate from which the selected components are integrated. For example, some or all of the temperature sensor 103, the controller 104, the power source 106 and the LEDs 102 may be integrated circuit (IC) in semiconductor (e.g., Si or Group III-V semiconductor). This IC may then be provided over the substrate for the temperature sensor 103, the controller 104, the power source 106 and the LEDs 102 of the fixture 100, or may include a selected number of these components. In the latter example, another substrate comprising the remaining components may be provided in addition to the IC. Finally, connections to and between the components of the substrate are effected using one of a variety of known techniques and materials.

In operation, the temperature sensor 103 takes temperature measurements of the fixture 100 generally, and particularly at one or more selected points or components of the first package 107 continuously or at predetermined time intervals. Notably, when the sensor 103, the processor 104, the power source 106 and the LEDs 102 are provided over a common substrate, the sensor 103 is configured to take temperature measurements at one or more locations on the common substrate, or within the housing 101, or both. Alternatively, when the components of the lighting fixture 100 are provided in first package 107 and second package 108, such as described above, the sensor 103 is configured to take temperature measurements at one or more locations in the first package 107, such as at one or more locations on the substrate(s) provided in the first package 107.

As described through illustrative embodiments herein, the temperature measurements taken by the sensor 103 of the fixture 100 are correlated to a junction temperature of the particular LEDs in use. Based on these correlations, the drive current to the LEDs 102 may be altered to optimize the light output at each LED, or to optimize the lifetime of each LED, or both. As will become clearer as the present description continues, when the correlated junction temperature is below a certain temperature, the drive current may be increased to increase luminous output of the LEDs 102, without significantly impacting the lifetime of the LED. By contrast, when the correlated junction temperature exceeds a certain temperature, in order to meet standards for LED lifetime, the drive current must be lowered.

The controller 104 comprises software, hardware or firmware, or a combination thereof, to determine the drive current for the correlated junction temperature based on the ambient temperature. To this end, the controller 104 may be an FPGA with software cores instantiated therein, a programmable microprocessor (e.g., Harvard architecture microprocessor) with suitable memory 105, or an application specific integrated circuit (ASIC) with suitable memory 105. The correlation of temperature comprises a first correlation of the temperature measured by the sensor 103 at one or more locations of the fixture 100 to the ambient temperature; and a second correlation between the temperature taken by the sensor 103 and the junction temperature. Based on the determined junction temperature, a drive current is chosen for operation of the LEDs 102 of the lighting fixture 100. The output of the controller 104 is provided to the power source 106, which converts an input signal from the controller into an output drive current for the LEDs 104. The drive current is then provided by the power source 106.

In accordance with a representative embodiment, the correlation of the temperature measured by the sensor 103 to the ambient temperature, and the correlation of the temperature measured by the sensor 103 to the junction temperature of the LEDs may be calculated algorithmically via computer readable code stored on a computer readable medium on the controller 104. In accordance with another representative embodiment, the correlations between measured sensor temperature, ambient temperature, junction temperature and drive current may be stored in memory 105, which may include a look-up table, instantiated in the controller 104.

Figure 1C:
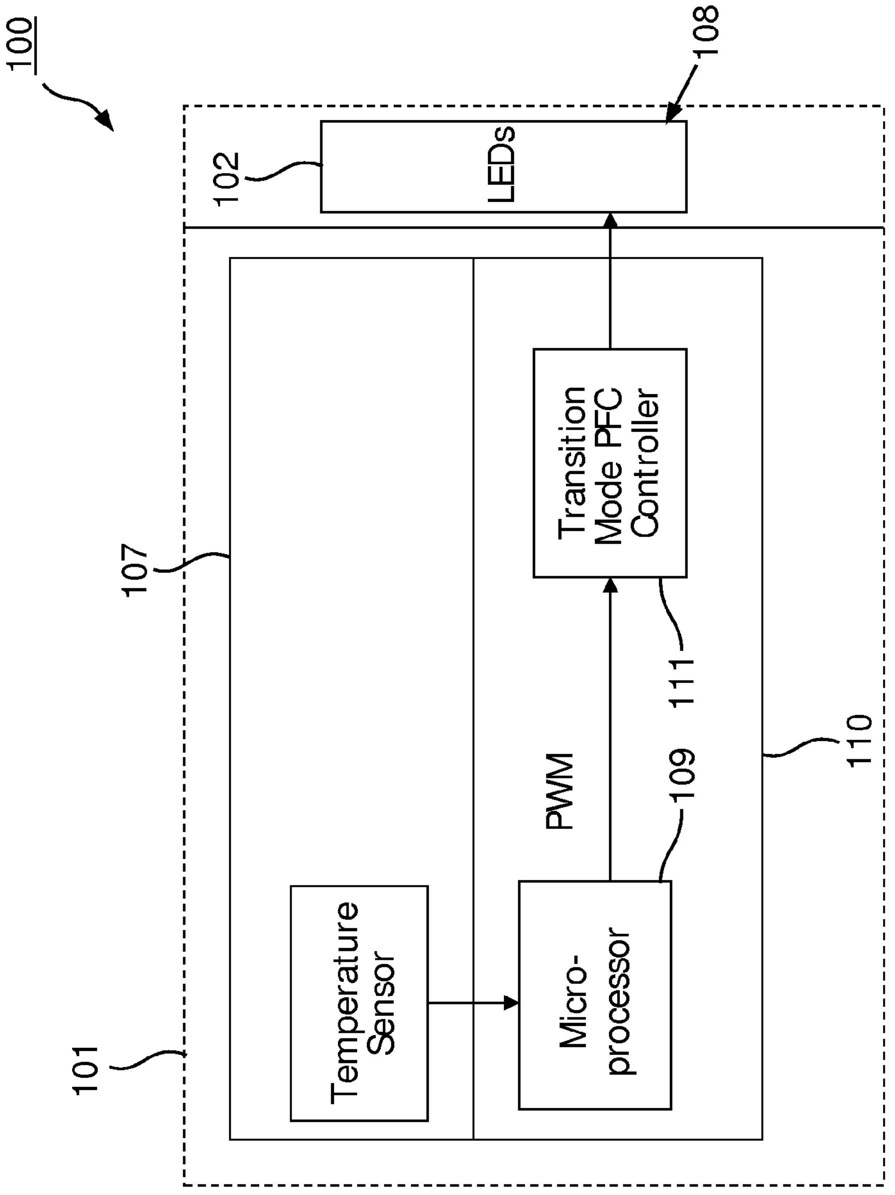
FIG. 1C illustrates a simplified schematic block diagram of an LED-based lighting fixture in accordance with a representative embodiment.

FIG. 1C illustrates a simplified schematic block diagram of lighting fixture 100 in accordance with a representative embodiment. Many of the details of the embodiments described in connection with FIGS. 1A and 1B are common to the embodiment described presently. Many of these details are not repeated in order to avoid obscuring the presently described embodiment.

The lighting fixture 100 comprises a microprocessor 109 and a transition mode power factor controller (PFC) 111. In the representative embodiment, the microprocessor 109 and the PFC 111 are provided in a third package 110. The temperature sensor 103 is provided in the first package 107, and the LEDs 102 are provided in the second package 108. Alternatively, the sensor 103, the microprocessor 109 and the PFC 111 may be provided in first package 107 and the LEDs 102 in the second package 108; or the microprocessor 109, the PFC 111 and the LEDs 102 may be provided in the same package. In any case, the sensor 103, the microprocessor 109, the PFC 111 and the LEDs 102 are disposed in the housing 101.

The sensor 103 measures the temperature at one or more locations of the lighting fixture 100 as described above. The microprocessor 109 converts the analog input from the sensor 103 to a digital value via an analog to digital (A/D) converter, which is used to determine a pulse width modulation (PWM) signal to be provided to the PFC 111. To this end, the digital value indicative of the measured temperature is correlated to an ambient temperature, and then correlated to a junction temperature of the particular LEDs in use. Based on these correlations, the PWM signal from the microprocessor 109 to the PFC 111 may be altered and the drive current output of the PFC 111 to the LEDs 102 thereby altered to optimize the light output at each LED, or to optimize the lifetime of each LED, or both. In a manner similar to the embodiments described above in connection with FIG. 1B, when the correlated junction temperature is below a certain temperature, the PWM signal result in an increased drive current to the LEDs 102 with insignificant impact on the lifetime of the LED. By contrast, when the correlated junction temperature exceeds a certain temperature, in order to meet standards for LED lifetime, the drive current must be lowered.

The correlation of the temperature measured by the sensor 103 to the ambient temperature, and the correlation of the temperature measured by the sensor 103 to the junction temperature of the LEDs 102 may be calculated algorithmically via computer readable code stored on a computer readable medium on the microprocessor 109 in accordance with a representative embodiment. In accordance with another representative embodiment, the correlations between measured sensor temperature, ambient temperature, junction temperature and drive current may be stored in memory, which may include a look-up table, instantiated in the microprocessor 109.

FIG. 2 illustrates a table including data useful in determining the drive current to the LEDs 102 with consideration of light output and LED lifetime. The table includes the ambient temperature, the temperature measured by the sensor 103, the average junction temperature and the estimated light output level in accordance with a representative embodiment. The table also includes the output voltage ($V_{out}$) of the temperature sensor, which is proportional to the temperature of the temperature sensor 103 during operation. As described above, an analog to digital (A/D) conversion translates the analog voltage ($V_{out}$) to a digital value as shown in the table. The table further includes an average LED case temperature, an average junction temperature, a steady state power level of the LEDs, and a light output level at the respective steady state power level. As alluded to previously, the temperature at the selected locations on the LED-based lighting fixture 100 is measured by the sensor 103, and from these data the junction temperature is determined based on the thermal resistance of the LED package. Once the junction temperature is determined, the drive current is determined at the controller 104 or the microprocessor 109 as described above.

The data in the table of FIG. 2 correlate the LED junction temperature and steady state power of the LEDs 102 at a particular measured temperature, and also correlate the ambient temperature to the junction temperature. From these correlations, the power (i.e., drive current) provided by the LEDs 102 is determined to increase the luminous output of the LEDs 102, or the lifetime of the LEDs 102, or both. As can be readily appreciated, the less power that is provided to the LEDs, the less heat that is dissipated by the LEDs, independent of the ambient temperature. Notably, the correlation is somewhat independent of the measurements of the temperature sensor 103. For example, in the embodiment described in connection with FIG. 1B, the power source 106, the temperature sensor 103 and the controller 104 may be provided on a substrate and in the first package 107, and the LEDs 102 may be provided on another (separate) substrate and in the second package 108. As such, the first package 107 comprising the power source 106 has a first thermal mass, and the second package 108 comprising the LEDs 102 has a second thermal mass separate from that of the first package 107. During operation, the temperature of the first package 107 comprising the temperature sensor 103, the controller 104 and the power source 106 generally will remain at a consistent ambient temperature, even when the power provided to the LEDs is increased or decreased. Turning to the table of FIG. 2, if for example, the power to the LEDs is maintained at 27.7 W, throughout the ambient temperature range (in this case 25° C. to 50° C.), the temperature measured by the sensor 101 will increase as shown in the table. The increase in temperature in the second package 108 comprising the LEDs 102 would result in an increase in the junction temperature of the LEDs 102 and therefore decrease the lifetime of the LEDs 102 due to the increase in ambient temperature. However, in accordance with representative embodiments, correlations of measured temperature to ambient temperature and to junction temperate are used to reduce the steady state power to the LEDs 102 as the temperature measured in the first package by the sensor 103 increases.

Beneficially, the method of altering the steady state power iteratively to maintain the LED junction temperature below a predetermined maximum level is effected independently of the ambient temperature. Thus, the LED lifetime is increased, but the light output is maintained at a relatively high level at normal ambient operating temperature (e.g., 25° C. to 35° C.).

Figures 3, 4:
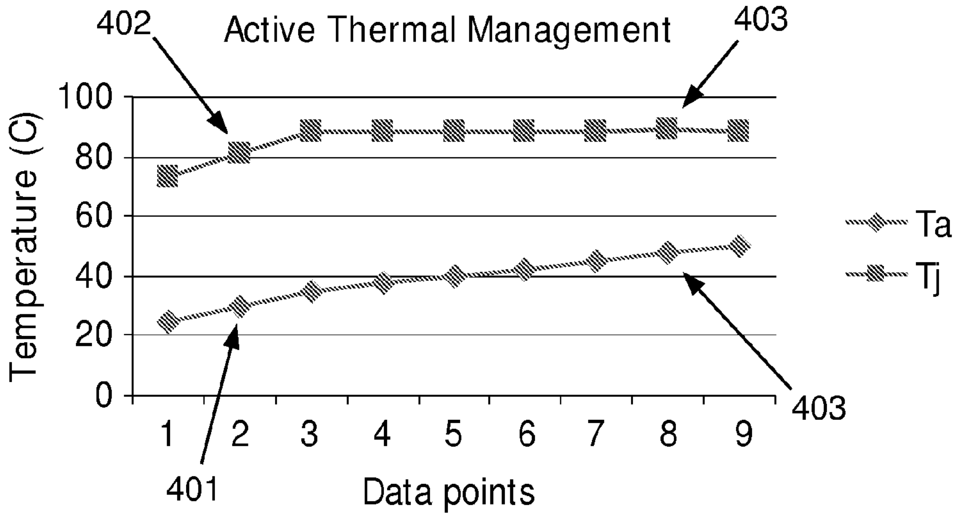
FIG. 3 illustrates a flow-chart of a method of controlling light output and lifetime of LEDs in accordance with a representative embodiment.
FIG. 4 illustrates a graph of temperature versus drive current in accordance with a representative embodiment.

FIG. 3 illustrates a flowchart of a method 300 of controlling light output and lifetime of LEDs in accordance with a representative embodiment. The method is implemented in a lighting fixture such as lighting fixtures 100 described above in connection with FIGS. 1B and 1C. Notably, the method 300 comprises calculations that may be carried out via the controller 104, or the microprocessor 109, and may be instantiated in a computer-readable medium implemented in therein. To this end, the computer readable medium comprises a measuring code segment for measuring a temperature at a location of an LED-based lighting fixture. The computer readable medium comprises a calculating code segment for calculating a temperature of an ambient of the LED based on the measured temperature. The computer readable medium comprises a calculating code segment for calculating a temperature of a junction of the LED based on the measured temperature. The computer readable medium comprises an adjusting code segment for adjusting a drive current so that the temperature at the junction remains below a threshold level, or adjusting the drive current to attain a particular luminous output level by the LED, or both.

As note previously, the controller 104 and the microprocessor 109 comprise one or more of software, hardware and firmware configured to determine various settings for the LEDs 102 depending on current conditions (e.g., ambient temperature), desired output from the LEDs, and lifetime requirements. Many of the details of the calculations and settings are similar or identical to those described above in connection with FIGS. 1A-1C and 2, and are not generally repeated in order to avoid obscuring the description of the presently described embodiments.

At 301, the method comprises measuring a temperature at a location of an LED-based lighting fixture. For example, according to an embodiment, the temperature sensor 103 measures the temperature of the ambient of the fixture 100. Notably, the temperature sensor 103 may be in the first package 107 in an embodiment where the LEDs 102 are in the second package 108. Alternatively, as described above, the temperature sensor 103 and all other components may be provided in the same package.

At 302, the method comprises calculating a temperature of a junction of the LED based on the measured temperature. The calculation of the temperature of the junction may comprise an algorithmic calculation in the controller 104 or the microprocessor 109. Alternatively, a look-up table or similar memory device in the controller 104 or the microprocessor 109 may comprise data compiled through multiple measurements that are statistically averaged. Still alternatively, the look-up table may be compiled by modeling the junction temperature incorporating various factors, such as the heat generation characteristics of the particular LEDs, heat dissipation capabilities of the first package 107 and the second package 108, and the components thereof.

At 303 the method comprises adjusting a drive current so that the temperature at the junction remains below a threshold level, or adjusting the drive current to attain a particular luminous output level by the LED, or both. The adjustment of the drive current to the LEDs 102 is effected by providing a digital value corresponding to the voltage ($V_{out}$) of the temperature sensor 103. The digital value is used at the controller 104 or the microprocessor 109 to correlate the temperature at the temperature sensor 103 to a junction temperature of the LEDs 104 via a computation or a look-up table, for example, and as described above. The correlated junction temperature of the LEDs is used to determine the drive current for the desired steady-state power level. For example, with reference to FIG. 2, the output from the controller 104 comprises a digital value that corresponds to a particular junction temperature and the required drive current for the desired steady state power level. By way of illustration, at am ambient temperature of 25° C. and a sensor temperature of 46.4° C., digital output of 263 is provided by an A/D converter to the controller 104. The controller 104 correlates this digital value to a junction temperature and drive current for this junction temperature. In this example, the junction temperature determined at the controller 104 is approximately 73.5° C. A command is provided to the power source 106 to provide this drive current to the LEDs 104. In this example, the drive current results in a power output of 27.7 W and 1050 L. In the present example, a maximum junction temperature of 90° C. is set for the LEDs 104 to ensure a lifetime within specifications or standards. Continuing with this example, if the correlated ambient temperature increases to 40° C., the digital value based on the voltage output from the temperature sensor 101 is changed to 327. This correlates to a junction temperature of 88.1° C., and the drive current is reduced to provide a steady-state power level of 26.5 W and 1002 L. As can be appreciated, the increased ambient temperature exacts a reduced steady state power level, and allows the LEDs 104 to function within lifetime specifications. Generally, therefore, the method 300 allows for a comparatively higher steady-state output for lower ambient temperatures and a comparatively lower steady-state output for higher ambient temperatures. Adjustment of the drive current can be made to provide a desired lifetime and desired light output.

FIG. 4 illustrates a graph of temperature versus drive current in accordance with a representative embodiment. Notably, $T_a$ refers to the ambient temperature, such as determined by the temperature sensor 101; and $T_j$ refers to the junction temperature determined by the controller 102 as described above. At 401, the ambient temperature is comparatively low, and the corresponding junction temperature at 402 is also comparatively low. At 403, the ambient temperature is appreciably higher. The corresponding junction temperature is shown at 403. These data are used by the controller 102 to determine the drive current for the desired light output, or desired LED lifetime, or both, and as described above.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.” “Consisting essentially of,” when used in the claims, shall have its ordinary meaning as used in the field of patent law.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

Any reference numerals or other characters, appearing between parentheses in the claims, are provided merely for convenience and are not intended to limit the claims in any way.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A light emitting diode (LED)-based lighting fixture, comprising:

at least one LED;

a power source configured to provide electrical power to the at least one LED;

a temperature sensor configured to measure a temperature at a selected location of the lighting fixture; and a controller connected between the temperature sensor and the power source, and configured to determine a temperature of a junction of the at least one LED based on the measured temperature, to determine a drive current based on the junction temperature, and to provide an input signal to the power source based on the determined drive current enabling the power source to drive the at least one LED in response to the input signal;

wherein the controller further comprises a memory for storing a value of the drive current for a respective junction temperature; and, wherein the controller is configured to calculate the junction temperature of the at least one LED using the measured temperature from a location different from the junction.

2. The LED-base lighting fixture as claimed in claim 1, wherein the controller comprises one of a microprocessor, a field programmable gate array, FPGA, and an application specific integrated circuit, ASIC.

3. The LED-based lighting fixture as claimed in claim 1, wherein the controller provides a pulse-width modulated, PWM, signal as the input signal to the power source based on the drive current.

4. The LED-based lighting fixture as claimed in claim 1, further comprising a first package comprising the power source, the temperature sensor and the controller, and a second package comprising the LED, the temperature sensor in thermal connection with the first package.

5. The LED-based lighting fixture as claimed in claim 1, wherein the power source and the controller are provided over a first substrate and the LED is provided over a second substrate, and the selected location is on the first substrate.

6. A method of controlling the operational lifetime of an LED, the method comprising:

measuring a temperature at a location on a first substrate of an LED-based lighting fixture;

calculating a temperature of a junction on a second substrate of the LED based on the measured temperature; and based on the calculating, adjusting a drive current of the LED so that the temperature at the junction remains below a threshold level, or a particular luminous output level by the LED is attained, or both.

7. The method as claimed in claim 6, further comprising storing a voltage for a respective junction temperature in a memory.

8. The method as claimed in claim 6, further comprising providing a pulse-width modulated signal to a power source for driving the LED based on the drive current.

9. A non-transitory computer readable medium storing a program, executable by a controller, for controlling the operational lifetime of an LED, the computer readable medium comprising:

a measuring code segment for measuring a temperature at a location on a first substrate of an LED-based lighting fixture;

a calculating code segment for calculating a temperature of a junction on a second substrate of the LED based on the measured temperature; and an adjusting code segment for adjusting a drive current of the LED so that the temperature at the junction remains below a threshold level, a particular luminous output level by the LED is attained, or both.

10. An apparatus for controlling the operational lifetime of an LED, the apparatus comprising:

a power source configured to drive the LED positioned on a first package using a drive current;

a temperature sensor positioned on a second package and configured to determine a temperature at a selected location on the second package of the lighting fixture;

a controller connected between the temperature sensor and the power source, and configured to correlate the determined temperature to a junction temperature of the LED, to determine the drive current based on the determined junction temperature, and to provide an input signal to the power source based on the determined drive current for driving the LED.

11. The apparatus as recited in claim 10, wherein the controller further comprises a memory, which stores the input power for a respective temperature.

12. The apparatus as claimed in claim 10, wherein the controller is further configured to determine the drive current so that the junction temperature is below a predetermined threshold value.

13. The apparatus as claimed in claim 10, wherein the controller comprises one of a microprocessor, a field programmable gate array (FPGA) and an application specific integrated circuit.

14. The apparatus as claimed in claim 13, wherein the input signal comprises pulse-width modulated signal.

* * * * *